(12) United States Patent
Franzen et al.

(10) Patent No.: US 8,789,635 B2
(45) Date of Patent: Jul. 29, 2014

(54) HEAVY-DUTY GROUND TRANSPORTATION VEHICLE, IN PARTICULAR AN UNMANNED HEAVY-DUTY TRANSPORTATION VEHICLE FOR ISO CONTAINERS

(75) Inventors: Hermann Franzen, Mönchengladbach (DE); Armin Wieschemann, Oberhausen (DE); Mike Hegewald, Oberhausen (DE); Jannis Moutsokapas, Monheim (DE)

(73) Assignee: Gottwald Port Technology GmbH, Düsseldorf (DE)

( * ) Notice: Subject to any disclaimer, the term of this patent is extended or adjusted under 35 U.S.C. 154(b) by 127 days.

(21) Appl. No.: 13/375,364

(22) PCT Filed: Jun. 8, 2010

(86) PCT No.: PCT/EP2010/058020
§ 371 (c)(1),
(2), (4) Date: Nov. 30, 2011

(87) PCT Pub. No.: WO2010/142687
PCT Pub. Date: Dec. 16, 2010

(65) Prior Publication Data
US 2012/0073889 A1    Mar. 29, 2012

(30) Foreign Application Priority Data
Jun. 10, 2009  (DE) .......................... 10 2009 025 051

(51) Int. Cl.
*B60R 16/04*     (2006.01)
*B60K 1/00*      (2006.01)

(52) U.S. Cl.
USPC ....................................... 180/68.5; 180/65.1

(58) Field of Classification Search
USPC ......... 180/68.5, 65.1, 65.21, 65.29, 167, 168, 180/169; 320/104, 109; 105/355, 356, 396, 105/404; 701/22–24
See application file for complete search history.

(56) References Cited

U.S. PATENT DOCUMENTS 4,397,365 A * 8/1983 Harbe et al. ................. 180/68.5
4,496,274 A * 1/1985 Pipes ............................ 414/340

(Continued)

FOREIGN PATENT DOCUMENTS

DE    4203778 C2    8/1992
DE    4112138 A1    10/1992

(Continued)

OTHER PUBLICATIONS

A. Schneider et al., "Fahrerlose-Transportsysteme," dated Jul. 4, 2007; available at http://www.tu-dresden.de/wwbwllog/Downloads/Vorlesungen/logistik_aktuell/20070704-Exzerpt_FTS.pdf.

(Continued)

*Primary Examiner* — J. Allen Shriver, II
*Assistant Examiner* — James M Dolak
(74) *Attorney, Agent, or Firm* — Gardner, Linn, Burkhart & Flory, LLP

(57) ABSTRACT

The invention relates to a heavy-duty ground transportation vehicle, in particular an unmanned guided heavy-duty transportation vehicle for ISO containers, which is environmentally friendly. This is achieved by arranging a battery in the heavy-duty transportation vehicle to supply power to a travelling drive of the vehicle. The battery is typically a lead battery of considerable weight, and is releasably connected to the transport vehicle in a manner that permits changing the battery (e.g., exchanging a depleted battery for a fresh battery) and recharging the depleted battery at a location outside the vehicle. The battery can be moved into and out of transport vehicle transversely with respect to a longitudinal direction of the vehicle.

17 Claims, 3 Drawing Sheets

(56) References Cited

U.S. PATENT DOCUMENTS

| | | | |
|---|---|---|---|
| 4,983,903 A * | 1/1991 | Bae et al. | 320/128 |
| 5,525,884 A * | 6/1996 | Sugiura et al. | 318/587 |
| 5,585,205 A * | 12/1996 | Kohchi | 180/65.1 |
| 6,105,696 A | 8/2000 | Chen | |
| 6,498,454 B1 * | 12/2002 | Pinlam et al. | 320/107 |
| 6,698,990 B1 * | 3/2004 | Dobner et al. | 414/139.9 |
| 7,438,144 B2 * | 10/2008 | Chene et al. | 180/12 |
| 7,648,329 B2 * | 1/2010 | Chilson et al. | 414/809 |
| 7,712,563 B2 * | 5/2010 | Niebuhr | 180/68.5 |
| 7,880,436 B2 * | 2/2011 | Fischer et al. | 320/124 |
| 8,157,492 B2 | 4/2012 | Franzen et al. | |
| 2008/0258682 A1 | 10/2008 | Li | |
| 2010/0213430 A1 | 8/2010 | Franzen et al. | |

FOREIGN PATENT DOCUMENTS

| | | | |
|---|---|---|---|
| DE | 4411843 A1 | 1/1995 | |
| DE | 102004028353 A1 | 1/2006 | |
| DE | 102005053305 A1 | 5/2007 | |
| DE | 102007025332 A1 | 12/2008 | |
| DE | 102007039778 A1 | 2/2009 | |
| EP | 2017218 A1 | 1/2009 | |
| JP | 48-9413 | 2/1973 | |
| JP | 61-179663 | 11/1986 | |
| JP | 1-159358 | 11/1989 | |
| JP | 2004-320882 | 11/2001 | |
| WO | 2008046728 A1 | 4/2008 | |
| WO | 2009/024569 | 2/2009 | |
| WO | 2009053524 A1 | 4/2009 | |

OTHER PUBLICATIONS

H. Matus, "Gesamtsystem elektrischer Strassenverkehr" (excerpts), dated 1999.

English translation of International Preliminary Report on Patentability from corresponding PCT Application No. PCT/EP2010/058020, dated Dec. 10, 2011.

International Preliminary Examination Report (IPER) of the International Searching Authority from corresponding PCT Application No. PCT/EP2010/058020, mailed May 20, 2011.

International Search Report and Written Opinion of the International Search Authority from corresponding Patent Cooperation Treaty (PCT) Application No. PCT/EP2010/058020, mailed Aug. 10, 2010.

English translation of the International Search Report of the International Search Authority from corresponding Patent Cooperation Treaty (PCT) Application No. PCT/EP2010/058020, mailed Aug. 10, 2010.

English translation of Japanese Examination Report dated Mar. 4, 2014, from Japanese Application No. JP 2012-514449, which is a national stage of PCT Application No. PCT/EP2010/058020.

* cited by examiner

HEAVY-DUTY GROUND TRANSPORTATION VEHICLE, IN PARTICULAR AN UNMANNED HEAVY-DUTY TRANSPORTATION VEHICLE FOR ISO CONTAINERS

BACKGROUND OF THE INVENTION

The present invention relates to heavy-duty ground transport vehicles, in particular heavy-duty automated guided vehicles for transporting ISO-containers.

German patent DE 42 03 778 C2 discloses an automated ground vehicle having a manipulator disposed thereon. By means of the ground vehicle, the manipulator can be moved automatically between different work stations in order to perform assembly tasks at these locations. The ground vehicle is driven via a replaceable nickel-cadmium battery. The battery can be changed automatically at a changing station if it has to be recharged. For this purpose, a vehicle frame of the ground vehicle is provided with a battery space, in which there are disposed guide rails which are aligned transversely with respect to the longitudinal direction of the ground vehicle. The underside of the battery is provided with rollers which roll on the guide rails. In order to prevent the battery from moving along the guide rails during operation of the ground vehicle, the vehicle frame is provided with a pin which is pretensioned in a resilient manner in the direction of the battery and engages into a recess in the battery during operation of the ground vehicle. In order to change the battery, the pin can be lowered hydraulically. The battery, thus released, can be pulled laterally out of the vehicle frame along the guide rails by means of a changing apparatus. For the purpose of the changing operation, the ground vehicle travels automatically to a changing station.

Furthermore, German patent application DE 10 2007 039 778 A1 discloses a heavy-duty automated guided ground vehicle for ISO-containers. The transport vehicle comprises a vehicle frame, on which at least one lifting platform is disposed, which can be raised from a lowered transport position to a raised transfer position or vice versa via at least one lifting drive. Typically, such transport vehicles are driven by a diesel engine.

SUMMARY OF THE INVENTION

The present invention provides a heavy-duty ground transport vehicle, in particular a heavy-duty automated guided vehicle for ISO-containers, having a travelling drive, which achieves improved environmental friendliness by virtue of a battery that is disposed in the heavy-duty transport vehicle for providing the travelling drive with power. A significant advantage of the heavy-duty transport vehicle operated by means of a battery, in the form of a traction battery, is that local emissions of pollutants can be avoided completely and sound emissions can be reduced considerably. As a consequence, the impact upon the immediate environment is considerably lower. The efficiency of the drive train can also be increased considerably. As a result, the total amount of power required to operate the vehicle can be reduced. Therefore, on the one hand, environmental compatibility is further improved and on the other hand operating costs can be reduced. The battery typically requires less maintenance than a diesel generator unit which has also hitherto been used for providing the electrical driving power. This makes it possible to reduce maintenance costs. Since the current for recharging the batteries can be generated from different power sources, the operation of the vehicle may be independent of the availability and the costs of diesel fuel.

In one aspect, the disposability of the heavy-duty transport vehicle may be increased by releasably connecting the battery to the heavy-duty transport vehicle for battery-changing purposes. The charging procedure for the battery can thus be performed outside the heavy-duty transport vehicle, and the heavy-duty transport vehicle can continue operation with a charged replaceable battery.

In another aspect, a rapid battery change is rendered possible by permitting, for changing purposes, the battery to be moved in and out transversely with respect to the longitudinal direction of the heavy-duty transport vehicle.

In still another aspect, the heavy-duty transport vehicle includes several front wheels and rear wheels, the front wheels being drivable by a first electric motor and the rear wheels being drivable by a second electric motor. In this case, the battery may be disposed between the front and rear wheels.

In order to make it even easier to change the battery, the heavy-duty transport vehicle may include a vehicle frame having an installation space for the battery, the installation space being open at the bottom and at the sides of the heavy-duty transport vehicle.

In constructional terms, it may be provided that, as seen in the longitudinal direction of the heavy-duty transport vehicle, carrier rails are disposed at the front and rear edge of the installation space and extend transversely with respect to the longitudinal direction of the heavy-duty transport vehicle, and the battery is supportable on the carrier rails.

Optionally, the battery may be attached in a particularly convenient manner to the heavy-duty transport vehicle by virtue of the fact that the battery is substantially cuboidal, sidewalls of the battery which are at the front and rear as seen in the longitudinal direction of the heavy-duty transport vehicle have support elements disposed thereon which protrude in each case from the front and rear sidewall and the battery is supported on the carrier rails via the support elements.

In relation to the change of battery, the heavy-duty transport vehicle can be formed advantageously in a passive manner, since, in the region of the support elements and the carrier rails, centering elements are disposed which, when the battery is moved into the installation space and is lowered onto the carrier rails, align the support elements with the carrier rails. It may also be provided that electrical contact elements are disposed on the battery, and in the region of the carrier rails electrical counter-contact elements are disposed, which contact elements can be electrically coupled or connected automatically by lowering the battery onto the carrier rails.

A high degree of reliability of the heavy-duty transport vehicle may be achieved by forming the battery as a lead battery, such as one that weighs between 6 t and 10 t, particularly since there is extensive experience in the use of lead batteries in vehicles.

The transport vehicle of the present invention may be particularly suitable or advantageous as a heavy-duty transport vehicle having a permissible total weight of at least 40 t.

These and other objects, advantages and features of this invention will become apparent upon review of the following specification in conjunction with the drawings.

DESCRIPTION OF THE PREFERRED EMBODIMENTS

Figure 1:
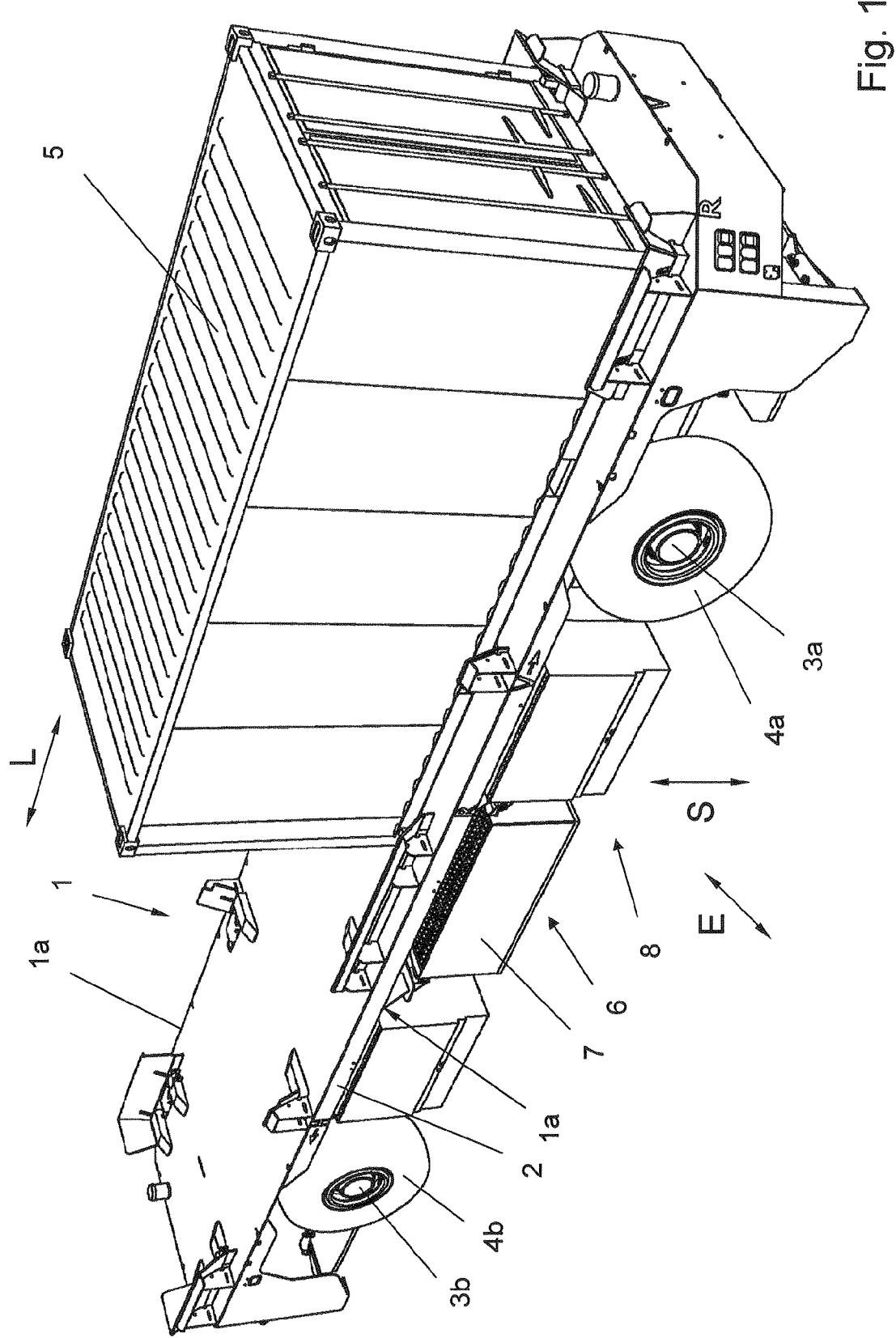
FIG. 1 is a top perspective view a heavy-duty automated guided ground vehicle for ISO-containers in accordance with the present invention.

Referring now to the drawings and the illustrative embodiments depicted therein, a heavy-duty automated guided ground vehicle 1 is provided for transporting containers 5 such as ISO-containers. In the illustrated embodiment, heavy-duty transport vehicle 1 has an empty weight of about 35 tonnes. Added to this is the weight of the ISO-container 5 to be transported, so that in the laden state a total weight of about 85 tonnes is achieved. The transport vehicle 1, which in the illustrated embodiment is formed as a four-wheel vehicle, includes a vehicle frame 2 on which two front wheels 4a are mounted on a common front axle 3a, and two rear wheels 4b are mounted on a common rear axle 3b. The four wheels 4a, 4b are provided with respective tyres. The vehicle frame 2 supports a planar platform 4, which serves to receive the ISO-containers 5 that are to be transported by the vehicle.

For purposes of this description, a heavy-duty transport vehicle is understood to be a vehicle which can transport a payload of at least about 15 t, and preferably at least about 20 t. Loads for the heavy-duty transport vehicles include ISO-containers and swap containers, for example. Laden swap containers can generally weigh up to about 16 t. In the laden state, ISO-containers typically weigh about 20 t to 80 t. Transport of ISO-containers may be preferred since ISO-containers are generally understood to be large standardised containers having standardised lifting points or corners for load receiving members. A heavy-duty transport vehicle which travels empty or transports an empty ISO-container or swap container is also to be included in this category, as long as this vehicle can transport a payload of at least about 15 t, and preferably at least about 20 t. It can also be the case that such heavy-duty transport vehicles operate in a mixed operation, i.e. can transport not only ISO-containers or swap containers but also other loads such as semitrailers, swap trailers, trailers, heavy goods vehicles or tractor trucks, for example.

Figure 2:
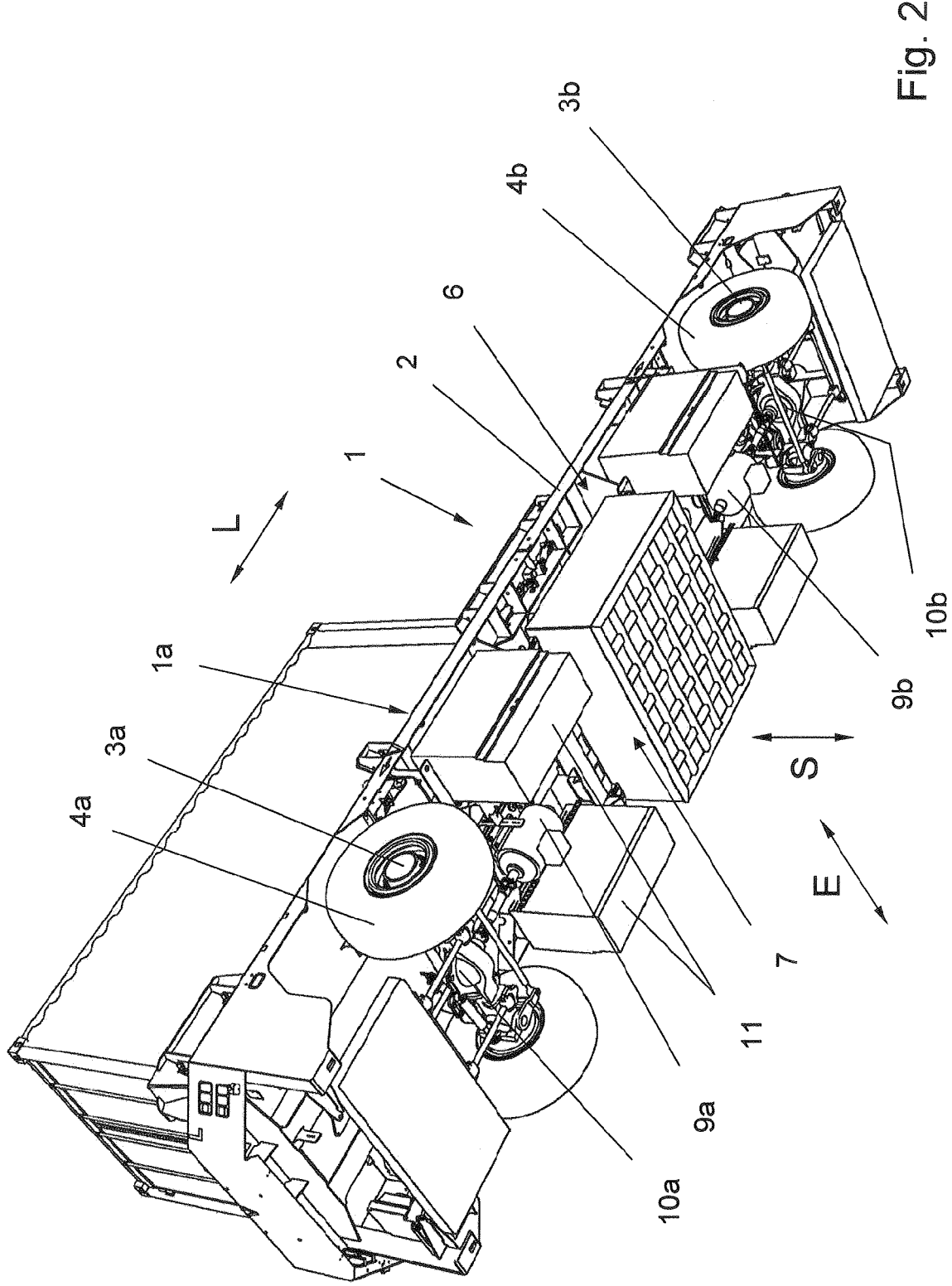
FIG. 2 is a bottom perspective view of the heavy-duty transport vehicle of FIG. 1.
Figure 3:
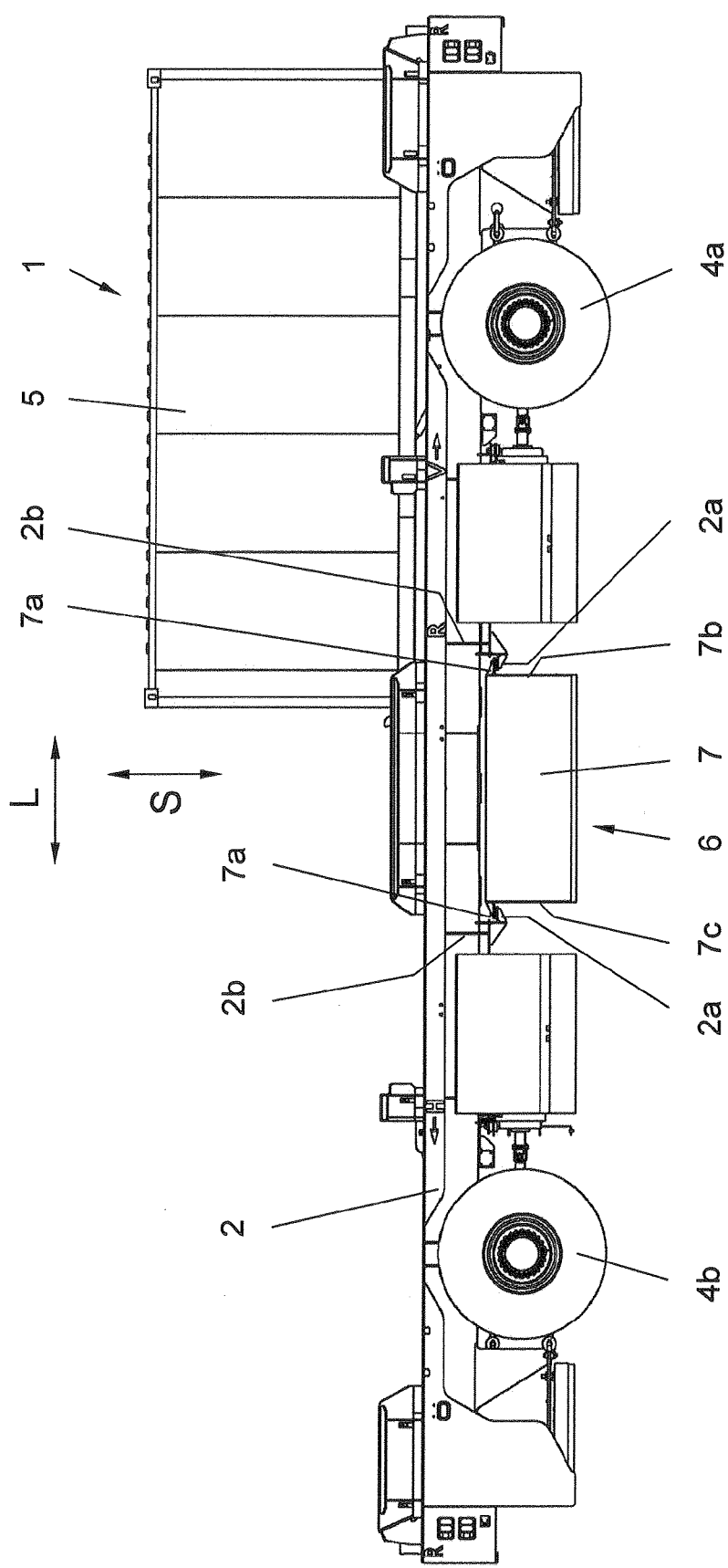
FIG. 3 is a side elevation of the heavy-duty transport vehicle of FIG. 1.

The vehicle frame 2 comprises an installation space 6 for a battery 7 (FIGS. 1-3). The installation space 6 begins below the platform 5 of the vehicle frame 2 and is open at the bottom in the direction of the ground 8 and on the sides 1a of the heavy-duty transport vehicle 1. Moreover, the installation space 6 is disposed between the front and rear wheels 4a, 4b of the heavy-duty transport vehicle 1. Since the installation space 6 is open towards the right and left side 1a as seen in the longitudinal direction L of the heavy-duty transport vehicle 1, in order to recharge the battery 7 outside the heavy-duty transport vehicle 1, the battery 7 can be changed in a convenient manner by means of a movement transverse to the longitudinal direction L of the heavy-duty transport vehicle 1 in a loading and unloading direction E (FIGS. 1 and 2). Moreover, the installation space 6 is open at the bottom, which means that the battery 7 can be loaded and unloaded by forklift truck-like handling equipment. The battery 7 may typically be formed as a lead battery having a weight of about 8 to 9 tonnes. This battery 7 can be used to operate the heavy-duty transport vehicle 1 for about 6 to 8 hours.

FIG. 2 illustrates a perspective view from below of the heavy-duty transport vehicle 1 in accordance with FIG. 1. In addition to the elements already described with respect to, FIG. 2 additionally shows Referring now to FIG. 2, a travelling drive of the heavy-duty transport vehicle 1 includes a front electric motor 9a, a front transfer gearbox 10a, a rear electric motor 9b, and a rear transfer gearbox 10b. The front electric motor 9a is attached in the region of the front axle 3a under the vehicle frame 2 and is attached centrally as seen in the longitudinal direction L of the heavy-duty transport vehicle 1. The rear electric motor 9b is attached in the region of the rear axle 3b under the vehicle frame 2 and is attached centrally as seen in the longitudinal direction L of the heavy-duty transport vehicle 1, The front electric motor 9a drives the two front wheels 4a via the front transfer gearbox 10 and the rear electric motor 9b drives the two rear wheels 4b via the rear transfer gearbox 10b. The heavy-duty transport vehicle 1 thus has a four-wheel drive.

Optionally, and as shown in FIG. 2, space is provided between the battery 7 and the front axle 3a for the suspension of switch cabinets 11 under the vehicle frame 2 in order to receive control components.

As best shown in FIG. 3, battery 1 is suspended on the vehicle frame 2 of the transport vehicle 2 via carrier rails 2a. In the illustrated embodiment, two carrier rails 2a are disposed at a mutual spaced interval, are aligned horizontally with respect to each other, and are attached at one height to the vehicle frame 2 via brackets 2b. The carrier rails 2a define the installation space 6 at the front and rear as seen in the longitudinal direction L of the vehicle. In order to be able to suspend the battery 7 on the carrier rails 2a, the cuboidal battery 1 has, on its front and rear sidewalls 7b, 7c and in the region of the corners of the battery 7, laterally projecting suspension elements 7a which, in the operating state of the battery 7, are supported on the carrier rails 2a of the heavy-duty transport vehicle 1. By means of this type of suspension of the battery 7 within the vehicle frame 2 and in the upper region thereof, a forklift truck or other lifting apparatus can easily be driven underneath the battery 7 in a convenient manner Then, by means of a movement of the forklift truck or other lifting apparatus in a vertical lifting and lowering direction S, the suspension elements 7a can be lifted off the carrier rail 2a and subsequently the battery 7 can be moved out of the transport vehicle 1 in an insertion and removal direction E. It is also provided that, by means of the vertical movement in the lifting and lowering direction S, the battery 7 (which is aligned with the carrier rails 2a and is protected from sliding by means of centering elements), is unlocked by the centering elements. In addition electrical contact elements are provided on the battery 7 and counter-contact elements are provided in the region of the carrier rails 2a for electrically connecting the battery 7 to the travelling drive. The advantage of this is that in relation to unlocking and contact removal, the heavy-duty transport vehicle 1 can be formed in a passive manner.

The intended fields of application for the heavy-duty transport vehicles described above and the associated battery-change systems would typically include ISO-container handling in docklands and in intermodal traffic between road and rail, for example.

Although the present invention has been described primarily with reference to a heavy-duty ground transport vehicle for the transportation of ISO-containers, it is envisioned that the principles of the present invention may be practiced to transport other heavy loads, such as slabs or coils, in metallurgical engineering, steel engineering and rolling mill engineering, for example.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A heavy-duty automated guided ground transport vehicle for ISO-containers, the transport vehicle comprising:
   a travelling drive;
   a lead battery for providing power to the travelling drive, the battery weighing between about 6 tons and 10 tons, and the battery being disposed in and releasably connected to the heavy-duty transport vehicle to permit changing the battery and recharging the battery outside the heavy-duty transport vehicle, whereby the battery can be moved into and out of the heavy-duty transport vehicle transversely with respect to a longitudinal direction of the heavy-duty transport vehicle;
   a vehicle frame defining an installation space for the battery, the installation space being open at the bottom and at both sides of the heavy-duty transport vehicle
   carrier rails disposed at front and rear edges of the installation space as viewed in the longitudinal direction of the heavy-duty transport vehicle, the carrier rails extending transversely with respect to the longitudinal direction of the heavy-duty transport vehicle, and wherein the battery is supported on the carrier rails; and
   wherein the heavy-duty transport vehicle has a permissible total weight of at least about 40 tons.

2. The transport vehicle as claimed in claim 1, further comprising;
   a plurality of front wheels and a plurality of rear wheels;
   a first electric motor for driving the front wheels; and
   a second electric motor for driving the rear wheels.

3. The transport vehicle as claimed in claim 2, wherein the battery is disposed between the front wheels and the rear wheels.

4. The transport vehicle as claimed in claim 1, wherein the battery is substantially cuboidal and comprises sidewalls at the front and rear of the battery as seen in the longitudinal direction of the heavy-duty transport vehicle, the sidewalls having support elements disposed thereon, with a respective support element protruding from the front sidewall and the rear sidewall, and wherein the battery is supported on the carrier rails via the support elements.

5. The transport vehicle as claimed in claim 4, further comprising centering elements disposed in the region of the support elements and the carrier rails, the centering elements being configured so that when the battery is moved into the installation space and is lowered onto the carrier rails, the centering elements align the support elements of the battery with the carrier rails.

6. The transport vehicle as claimed in claim 4, further comprising:
   electrical contact elements that are disposed on the battery;
   electrical counter-contact elements that are disposed in the region of the carrier rails; and
   wherein the contact elements and the counter-contact elements can be electrically connected automatically by lowering the battery onto the carrier rails.

7. The transport vehicle as claimed in claim 5, further comprising:
   electrical contact elements that are disposed on the battery;
   electrical counter-contact elements that are disposed in the region of the carrier rails; and
   wherein the contact elements and the counter-contact elements can be electrically connected automatically by lowering the battery onto the carrier rails.

8. The transport vehicle as claimed in claim 2, wherein the battery is substantially cuboidal and comprises sidewalls at the front and rear of the battery as seen in the longitudinal direction of the heavy-duty transport vehicle, the sidewalls having support elements disposed thereon, with a respective support element protruding from the front sidewall and the rear sidewall, and wherein the battery is supported on the carrier rails via the support elements.

9. The transport vehicle as claimed in claim 8, further comprising centering elements disposed in the region of the support elements and the carrier rails, the centering elements being configured so that when the battery is moved into the installation space and is lowered onto the carrier rails, the centering elements align the support elements of the battery with the carrier rails.

10. The transport vehicle as claimed in claim 9, further comprising:
    electrical contact elements that are disposed on the battery;
    electrical counter-contact elements that are disposed in the region of the carrier rails; and
    wherein the contact elements and the counter-contact elements can be electrically connected automatically by lowering the battery onto the carrier rails.

11. The transport vehicle as claimed in claim 8, further comprising:
    electrical contact elements that are disposed on the battery;
    electrical counter-contact elements that are disposed in the region of the carrier rails; and
    wherein the contact elements and the counter-contact elements can be electrically connected automatically by lowering the battery onto the carrier rails.

12. The transport vehicle as claimed in claim 3, wherein the battery is substantially cuboidal and comprises sidewalls at the front and rear of the battery as seen in the longitudinal direction of the heavy-duty transport vehicle, the sidewalls having support elements disposed thereon, with a respective support element protruding from the front sidewall and the rear sidewall, and wherein the battery is supported on the carrier rails via the support elements.

13. The transport vehicle as claimed in claim 12, further comprising centering elements disposed in the region of the support elements and the carrier rails, the centering elements being configured so that when the battery is moved into the installation space and is lowered onto the carrier rails, the centering elements align the support elements of the battery with the carrier rails.

14. The transport vehicle as claimed in claim 13, further comprising:
    electrical contact elements that are disposed on the battery;
    electrical counter-contact elements that are disposed in the region of the carrier rails; and
    wherein the contact elements and the counter-contact elements can be electrically connected automatically by lowering the battery onto the carrier rails.

15. The transport vehicle as claimed in claim 12, further comprising:
    electrical contact elements that are disposed on the battery;
    electrical counter-contact elements that are disposed in the region of the carrier rails; and
    wherein the contact elements and the counter-contact elements can be electrically connected automatically by lowering the battery onto the carrier rails.

16. A heavy-duty automated guided ground transport vehicle for ISO-containers, the transport vehicle comprising:
    a vehicle frame defining an installation space for a battery, the installation space being open at the bottom and at both sides of the heavy-duty transport vehicle
    a travelling drive coupled to said vehicle frame;
    a lead battery for providing power to the travelling drive, the battery being disposed in and releasably connected to the heavy-duty transport vehicle to permit changing the battery and recharging the battery outside the heavy-duty transport vehicle, whereby the battery can be moved into and out of the heavy-duty transport vehicle transversely with respect to a longitudinal direction of the heavy-duty transport vehicle;

carrier rails disposed at respective front and rear edges of the installation space as viewed in the longitudinal direction of the heavy-duty transport vehicle, the carrier rails extending transversely with respect to the longitudinal direction of the heavy-duty transport vehicle;

respective brackets extending downwardly from said vehicle frame and coupling respective ones of the carrier rails to the vehicle frame, wherein the carrier rails are spaced below the vehicle frame by the brackets; and wherein the battery is supported on the carrier rails.

17. The transport vehicle as claimed in claim 16, wherein the installation space is substantially open in all directions below said carrier rails, so that a bottom surface, left and right side surfaces, and forward and rearward surfaces of the battery remain substantially accessible when the battery is supported on the carrier rails.

\* \* \* \* \*